United States Patent [19]
Taylor

[11] Patent Number: 4,472,276
[45] Date of Patent: Sep. 18, 1984

[54] HIGH-SPEED CENTRIFUGAL FILTER ASSEMBLY AND METHOD

[75] Inventor: Dermot B. Taylor, Thousand Oaks, Calif.

[73] Assignee: The Regents of the University of California, Berkeley, Calif.

[21] Appl. No.: 257,507

[22] Filed: Apr. 24, 1981

Related U.S. Application Data

[63] Continuation-in-part of Ser. No. 171,924, Jul. 24, 1980, abandoned.

[51] Int. Cl.³ .............................................. B01D 33/22
[52] U.S. Cl. ...................... 210/236; 210/361
[58] Field of Search .................... 29/163.5 F, 457; 210/927, 448, 452, 350, 236, 479, 474, 476, 359, 361, 380 R, 382, 497.3, 493.1, 232; 233/2

[56] References Cited

U.S. PATENT DOCUMENTS

| | | | |
|---|---|---|---|
| 1,150,910 | 8/1915 | Warmington | 210/493.1 X |
| 2,291,427 | 7/1942 | Wolcott | 210/497.3 X |
| 2,854,143 | 9/1958 | Novak | 210/361 X |
| 3,583,627 | 6/1971 | Wilson | 233/2 |
| 4,127,131 | 11/1978 | Vaillancourt | 210/927 X |
| 4,221,670 | 9/1980 | Ziemek | 210/474 |

FOREIGN PATENT DOCUMENTS

| 147397 | 9/1950 | Australia | 210/493.1 |
|---|---|---|---|
| 12365 | 9/1910 | France | 210/232 |

Primary Examiner—Frank Spear
Attorney, Agent, or Firm—Herzig, Schaap & Yanny

[57] ABSTRACT

The filter assembly for swinging bucket type centrifuges includes a cylindrical filter body disposed within a filter body holder, both having hemispherical outer ends. The diameter of curvature of the filter body is smaller than the diameter of curvature of the holder allowing the contact surface between the holder and the body to be in the shape of a ring; centrifugal forces thus result in compression of the filter body thereby preventing cracking. The filter's crenelated shape is provided through use of a plunger to apply force to the filter against the crenelated filter membrane forming member. The filter assembly also may have a chamber and a meniscus equalizing pore around the filter holder. The chamber and appropriately positioned pore prevent fluid from rising during centrifugation and contaminating the particulate. A method for installation includes providing a filter body with an open inner end and a rounded outer end, placing a filter plate in one recess therein and a filter membrane in the other recess therein and applying force to provide the membrane with a crenelated shape. Another method includes the additional step of positioning an insert within the body to form a fluid retaining cavity and a meniscus equalizing pore.

28 Claims, 12 Drawing Figures

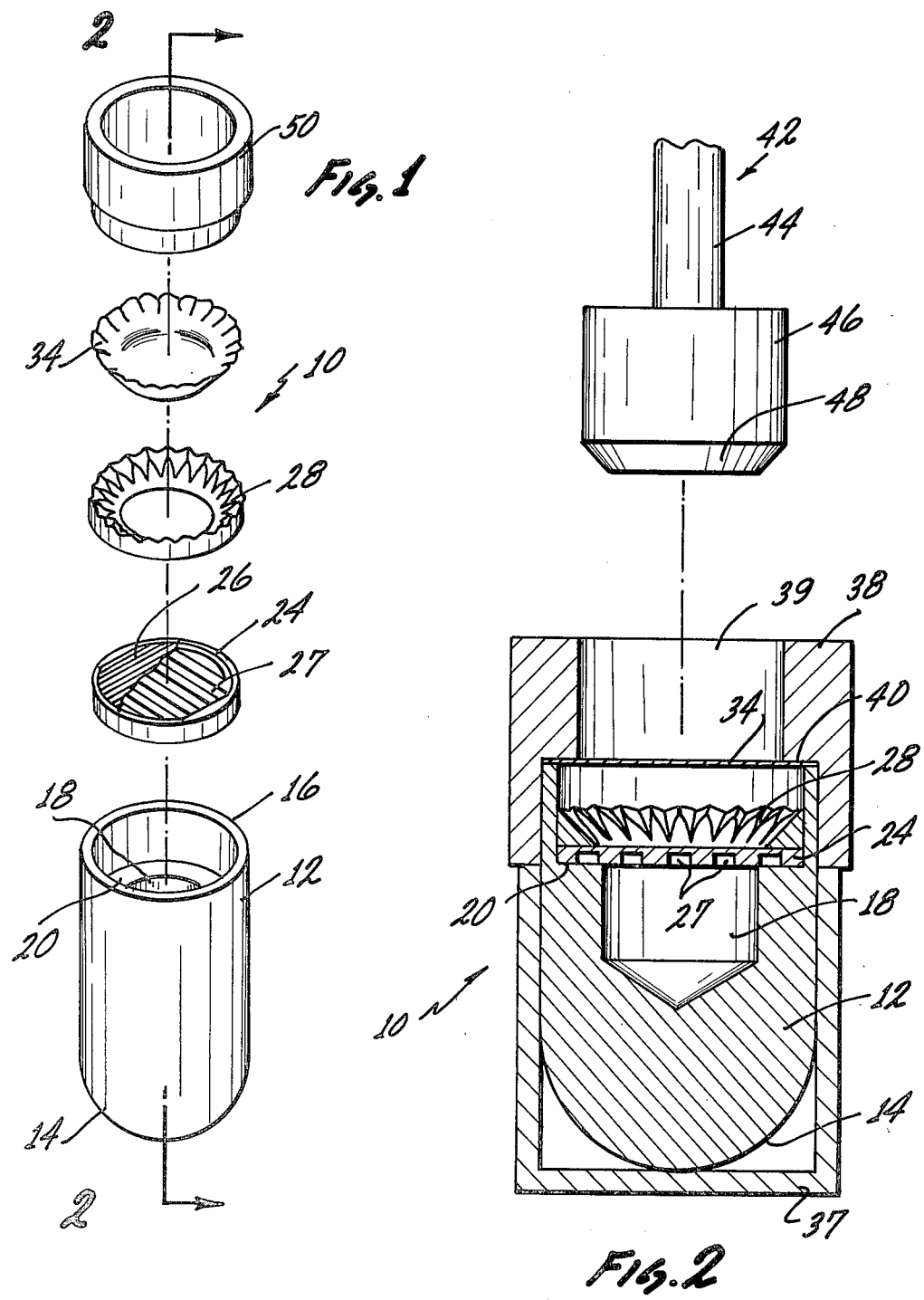

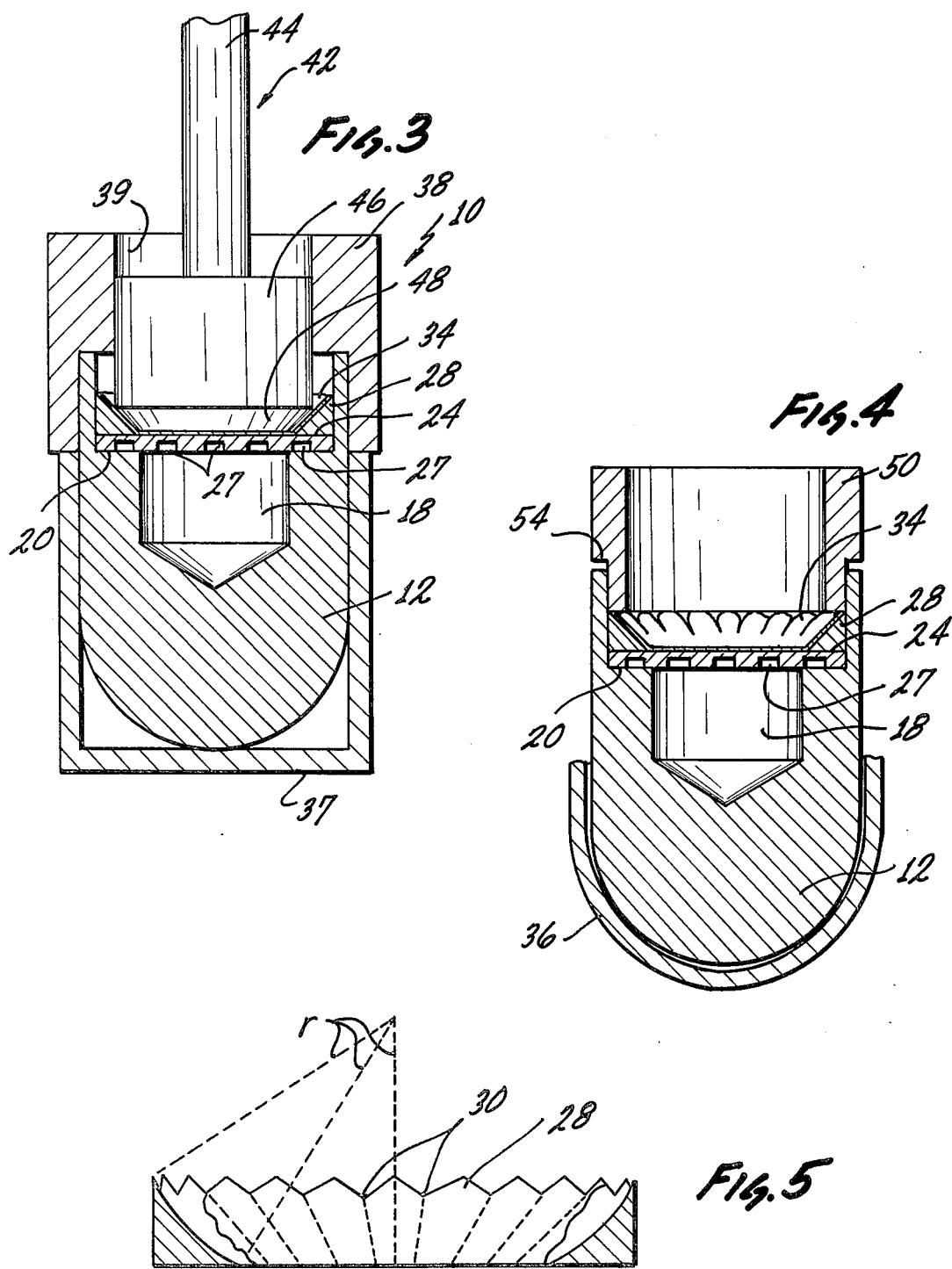

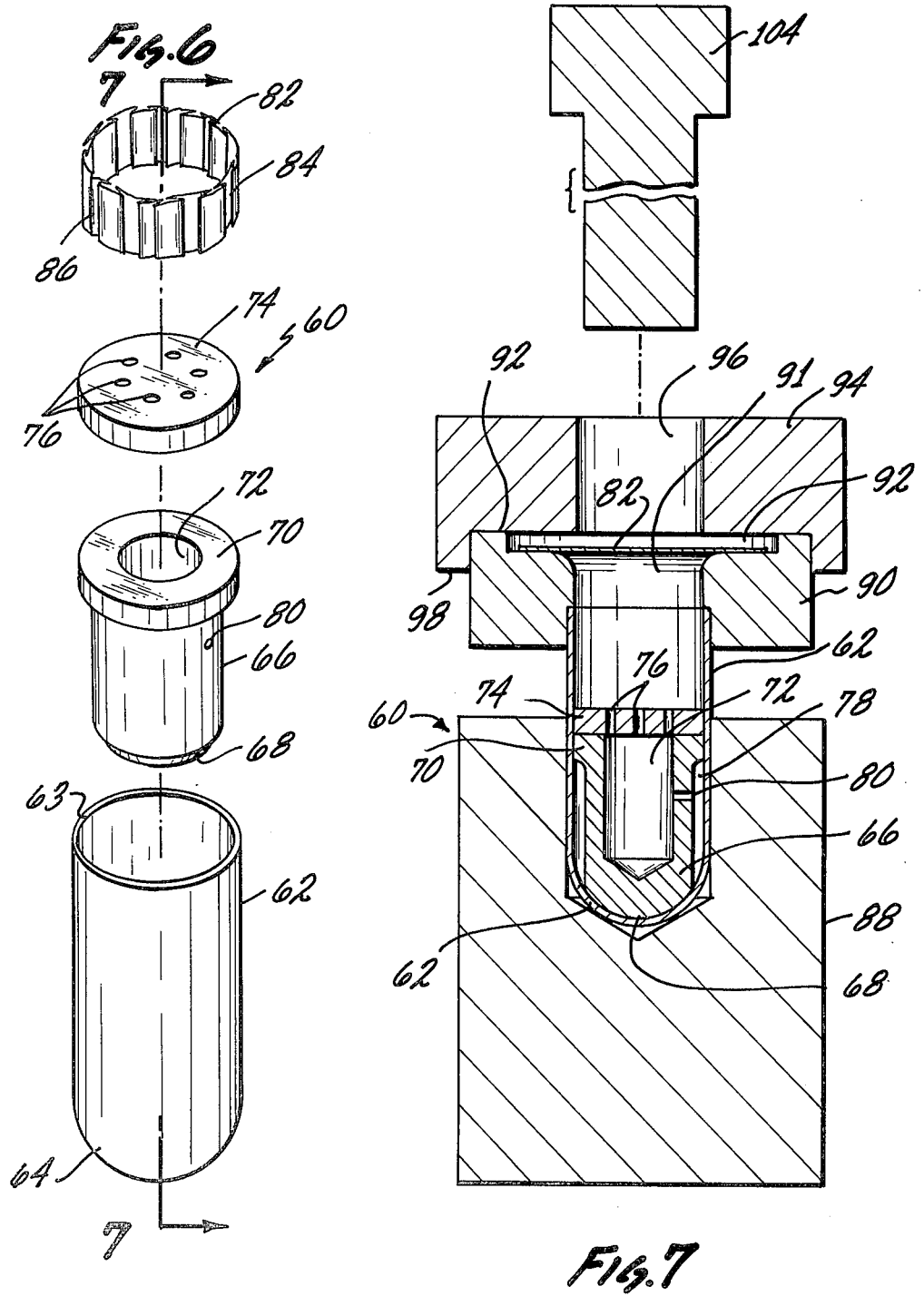

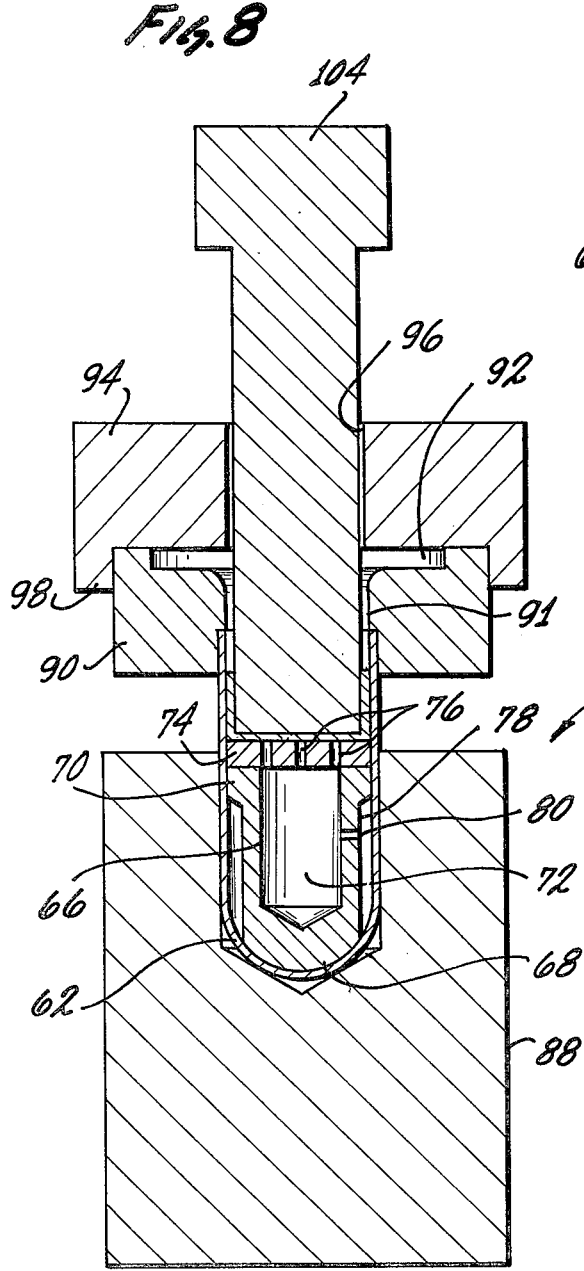

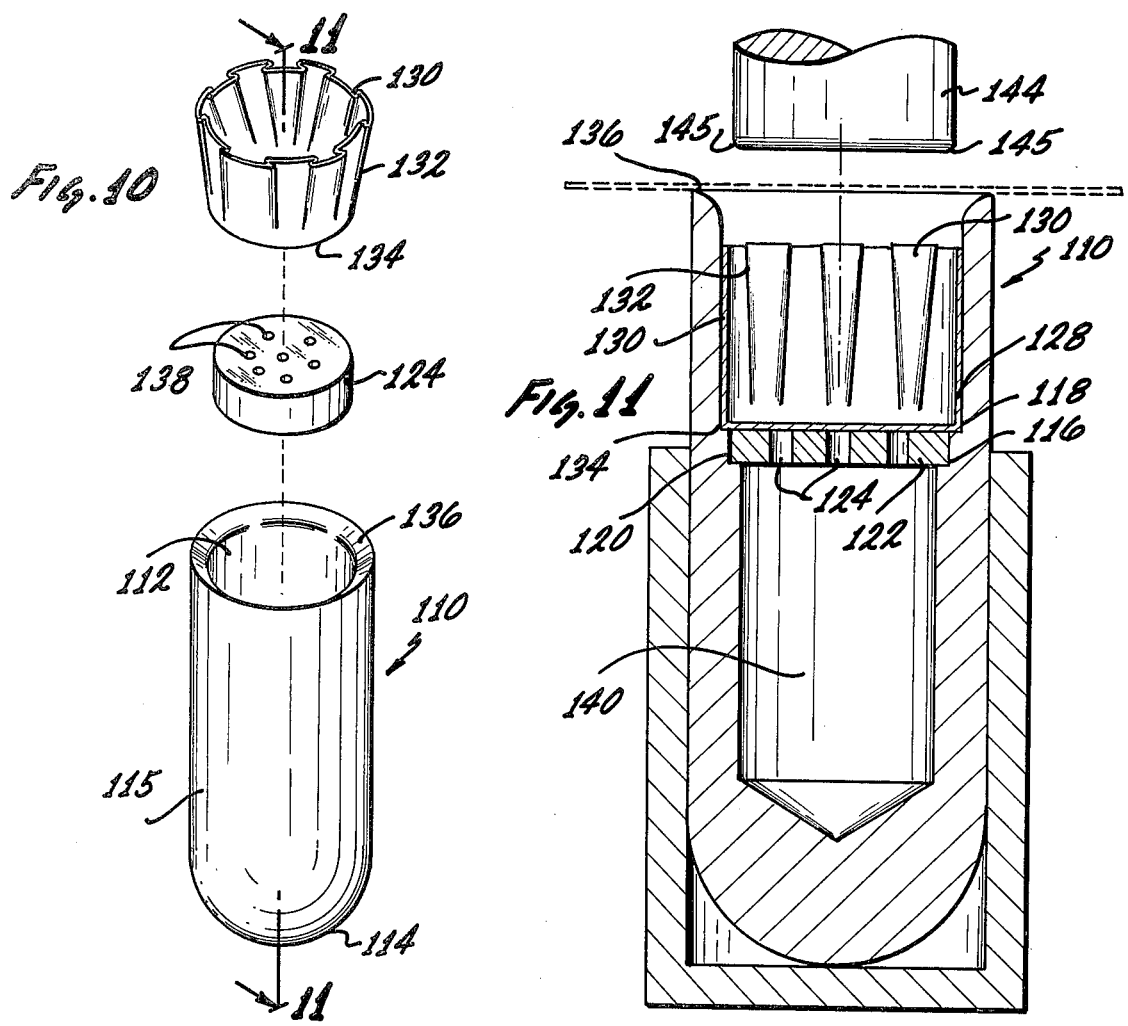

HIGH-SPEED CENTRIFUGAL FILTER ASSEMBLY AND METHOD

CROSS-REFERENCE TO RELATED PATENT APPLICATION

This application is a continuation-in-part of parent application, Ser. No. 171,924 filed July 24, 1980, for "High Speed Centrifugal Filter Assembly and Method", now abandoned.

BACKGROUND OF THE INVENTION

1. Field of the Invention

The invention pertains to apparatus and methods for providing filters and filter assemblies for swinging bucket-type ultracentrifuge rotors.

2. Description of the Prior Art

Centrifuge equipment has been known for a number of years. The swinging bucket type of centrifuge rotor consists generally of a rotor and a stand, with a rack mounted on the rotor for insertion of tubes or buckets for material to be subjected to centrifugation. The buckets or tubes may include filters with material to be filtered thereby under the influence of centrifugation. Centrifugal forces generated by the rotary motion of the centrifuges cause the buckets to pivot so that they are disposed generally parallel to the plane of the motion of the centrifuge rotor.

Devices providing very high rotational velocities are referred to as high-speed or ultracentrifuge equipment. Such devices operate in the range of 10,000 to 50,000 r.p.m. Such devices include the swinging bucket type of rotor referred to above. Ultracentrifugation, of course, provides an even greater capability of separation of components than does centrifugation at lower rotational velocities. In ultracentrifuges, however, separation is generally achieved through differential motion of components having different masses; filtration is generally not employed with such equipment because of the inability of filters to withstand the extremely high forces generated under such centrifugation.

Desirable characteristics for filter assemblies in swinging bucket-type centrifuges include the ability to retain separation between the filtrate and its medium and in particular to minimize as much as possible the presence of residual fluid medium upon the precipitate or the filter during and after centrifugation. Further desirable characteristic is an ability to provide a filter membrane and filter plate such that the medium and filtrate are directed to the maximum extent possible through the filter as opposed to escaping, for example, around the sides of the filter assembly and that no precipitate or particulate matter is left adhering to portions of the filter structure. Other criteria for merit of filter assemblies include, of course, considerations of compactness, durability, and economy, as well as ease of use and, in particular, of preparation and installation of the filter membrane in the filter assembly.

Particularly with respect to high-speed centrifuge applications, an extremely significant consideration is the ability of the filter assembly to withstand the substantial forces generated during ultracentrifugation without breaking or substantially deforming. Existing devices, such as those depicted in U.S. Pat. Nos. 3,300,051 (to Mitchell); 4,076,170 (to Chuley, et al); 2,854,143 (to Novak); and 3,583,627 (to Wilson) do not exhibit all of the desirable characteristics referred to and are not suitable for use in applications involving high-speed centrifugation in the 10,000 to 50,000+ r.p.m. range.

Thus, there has been a felt but unfulfilled need for a filter assembly and method for installing such assembly, suitable for use with high-speed centrifuge equipment which combines economy, durability, ease of installation, and efficiency of operation.

SUMMARY OF THE INVENTION

A filter assembly for use with high-speed centrifugation apparatus comprises a filter body adapted to be disposed within a filter holder in a centrifugel rotor, the filter body having an outer end of generally rounded configuration with a radius of curvature greater than that of the filter holder, the filter body defining an interior chamber. The filter assembly further includes a filter plate means disposed within the interior chamber and defining a plurality of fluid flow paths. A filter membrane forming member is disposed within the interior chamber of the filter body and adjacent the filter plate means and has a crenelated periphery for contact with a filter membrane to form the membrane to a crenelated configuration. The crenelations in the filter forming member may comprise a multiplicity of spherical sections adjoining one another, intersecting at substantially straight lines, and having a substantially triangular cross-section with one leg of said triangle being arcuate.

An extremely high-speed filter assembly according to an alternative embodiment of the invention comprises a filter body having a hollow interior and an outer end of generally rounded configuration, and further comprises a filter insert member defining an interior chamber and disposed within the hollow interior of the filter body. The filter insert member has an outer end of generally rounded configuration with a radius of curvature larger than the radius of curvature of a filter holder attachable to extremely high-speed centrifugation equipment, the filter insert member further including means for contacting the inner walls of the filter body, the filter body and filter insert member forming a chamber therebetween and the filter insert having a meniscus equalizing pore connecting the interior chamber of the filter insert member and said chamber between said filter insert member and said filter body. The assembly further includes filter plate means disposed in contact with the filter insert member, said filter plate having a plurality of perforations for passage of fluid therethrough.

A filter membrane is disposed in contact with the filter plate member, the peripheral wall of said filter membrane being crenelated.

A filter assembly for high-speed centrifugation comprises a filter body having a peripheral wall, an outer end of generally hemispherical configuration, and an open inner end, said hemispherical outer end having a diameter larger than that of a centrifuge holder into which the filter body is placed for centrifugation, the filter body having a generally hollow interior and including a first interior shoulder extending from the wall of the filter body and including a second interior shoulder extending from the wall of the filter body and spaced from the first interior shoulder, the latter being closer to the hemispherical outer end of the filter body than the former, the filter body further including an interior side wall disposed between the first shoulder and the second shoulder to form a first recess, the second shoulder and the wall of the filter body forming a second recess, the diameter of the first shoulder being smaller than the diameter of the second shoulder, and the diameter of the first recess being smaller than the diameter of the second recess. A filter plate member is disposed within the first recess and defines a plurality of perforations for passage therethrough of filtrate material and is supported by the first shoulder. A filter membrane is disposed within the second recess, the filter membrane having a generally cup-shaped configuration and including a floor and a side wall, the filter membrane being in contact with the second shoulder and above the filter plate member and the side wall of the filter membrane being in contact with the wall of the filter body, the floor of the filter membrane having a diameter greater than that of the filter plate member.

A method of providing a filter assembly for high-speed centrifugation includes the steps of providing a filter body having an open end and a hollow interior, inserting a filter plate member in the filter body, disposing a filter forming member upon the filter plate member, the filter forming member being configured to form a filter membrane into a desired configuration, and forcibly thrusting a filter membrane against the filter forming member to form the filter membrane into a desired configuration.

A method for providing a filter assembly for use in extremely high-speed centrifugation apparatus comprises providing a filter body having a hollow interior and open end, positioning a filter insert member within the filter body to form a fluid retaining cavity and a meniscus equalizing pore, disposing a filter plate member in contact with the filter insert member, disposing a filter membrane upon the open end of the filter body, and forcibly thrusting the filter membrane into the filter body against the filter plate member, whereby the filter membrane assumes a form with crenelated sides and a substantially flat bottom in contact with the filter plate member and with said crenelated sides in contact with the wall of the filter body.

A method for providing a filter assembly for use in an alternative extremely high-speed centrifugation assembly comprises providing a filter body having a hollow interior and an open inner end, and defining in its interior a first recess and a second recess, the former being further from the open end of the filter body and having a smaller diameter than the second recess, disposing a filter plate in the first recess, preforming into a cup-shaped configuration a filter membrane, and disposing the filter membrane in the second recess adjacent to the filter plate such that a portion of the bottom of the filter membrane extends peripherally beyond the peripheral boundary of the filter plate with sidewalls of the filter membrane being correspondingly displaced from the peripheral boundary of the filter plate. Alternatively, the filter membrane in an unformed state may be forcibly urged into the second recess thereby forming it into the desired configuration.

BRIEF DESCRIPTION OF THE DRAWINGS

FIG. 1 is a perspective view of a disassembled filter assembly in accordance with the invention;

FIG. 2 is a sectional view through the line 2—2 of the device of FIG. 1 in an assembled condition, including a means for installing a filter membrane therein, and showing the assembly disposed within a holder;

FIG. 3 is a sectional view as depicted in FIG. 2 with a further step of installation of the filter membrane depicted;

FIG. 4 is a sectional view of the invention as depicted in FIGS. 2 and 3 showing a completely formed and installed filter membrane installed in a centrifuge bucket (depicted in simplified and fragmentary form);

FIG. 5 is a detailed fragmentary view of the filter-forming portion of the filter assembly of the invention;

FIG. 6 is a perspective view of a disassembled alternative filter assembly in accordance with the invention;

FIG. 7 is a sectional view through the line 7—7 of an assembled filter assembly in accordance with FIG. 6 additionally depicting a step in the process of installing a filter membrane therein and showing the assembly disposed within a holder;

FIG. 8 is a depiction of the filter assembly of FIG. 7 with a further step in the process of installing the filter membrane therein;

FIG. 9 is an enlarged fragmentary view of the filter assembly of FIG. 7 depicting a fully installed filter membrane, with the filter assembly positioned in a centrifuge bucket (depicted in fragmentary and simplified form);

FIG. 10 is a perspective view of a disassembled second alternative filter assembly in accordance with the invention;

FIG. 11 is a sectional view through the line 11—11 of an assembled filter assembly in accordance with FIG. 10; and FIG. 12 is a depiction of a method for providing a filter assembly in accordance with FIG. 10.

DETAILED DESCRIPTION OF THE INVENTION

As depicted in FIGS. 1-5, inclusive, a filter assembly 10 for use with swinging bucket-type ultracentrifuge equipment, in accordance with the invention, comprises a filter body 12. Filter body 12 is cylindrical with an outer end 14 which is hemispherical in form. (The terms "outer" and "inner" as employed herein shall refer to the orientation of the filter assembly when installed on centrifugation equipment and are equivalent, respectively, to "lower" and "upper" with respect to the orientation of the drawings on the page). An inner end 16 of filter body 12 is open and has a smaller radius than the radius of the hemispherical outer end 14. The filter body 12 defines a chamber 18 containing a shoulder 20, which is integral with the filter body 12. The latter is machined of a selected material having a minimum of discontinuities, such as optical quality polycarbonate. Such material characteristic is desirable for withstanding the substantial stresses which occur in connection with high-speed centrifugation.

The chamber 18 in the embodiment depicted comprises substantially approximately one-half of the length of the filter body 12, though other dimensions and proportions may be selected in accordance with the invention. The chamber portion which extends outwardly of the shoulder is cylindrical and has a somewhat smaller radius than the inner portion of the hollow interior above the shoulder 20.

A filter plate 24 is disposed upon shoulder 20. Filter plate 24 may be of conventional type and defines a plurality of fine slots 26 transverse to a plurality of spaced-apart ribs 27. The filter plate 24 loosely fits into chamber 18 and is readily installed thereinto and removed therefrom.

A filter forming ring 28 is disposed within chamber 18 of filter body 12 and rests upon filter plate 26. Filter forming ring 28 fits somewhat loosely in filter body 14, though somewhat more snugly than filter plate 24. Filter forming ring 28 is configured to have a peripheral folded crenelated centrifugation. As best seen in FIGS. 1 and 4, membrane forming ring 28 defines a multiplicity of grooves 30 between folds of the uppermost region of its perimeter. In the particular embodiment depicted, the grooves 30 are 24 in number; however, in accordance with the invention, different numbers may be used in a particular application in which the invention is used. In section, the peripheral surface of the ring 28 forms a substantially triangular configuration with one leg of the triangle being arcuate. The permieter of the ring 28 is configured to be spherical with a radius of curvature such that in section the sphere would cut through the inner vertices of the triangular cross-section of the ring 28, as shown in FIG. 5 wherein radii of said sphere are designated "r".

The crenelated form of ring 28 has the desirable effect of increasing the circumference of the ring to match that of a filter membrane which, as described fully hereinbelow, is formed by pressure contact with the ring. The form of the ring also reduces the tendency of a filter membrane to slide down the upper surface of the ring and form undesirable liquid retaining folds at the junction of the ring and the filter plate 24, during centrifugation.

A filter membrane 34 rests upon the filter forming member 28. Filter membrane 34 is crenelated and matches the configuration of the inner surface of ring 28, upon which it rests. As is fully described hereinbelow, the filter membrane 34 is configured in its crenelated form though thrusting of it against filter forming member 28 by means of application of pressure.

As depicted in FIG. 4, the filter body 12 is disposed in a filter holder 36 in the form of a centrifuge bucket (shown only in fragmentary and simplified form) attached to a high-speed centrifugal rotor (not shown). Holder 36 is cylindrical in form with a rounded outer end having an interior radius of curvature slightly smaller than the radius of curvature of the hemispherical end 14 of the filter body 12. As a result, contact of the outer hemispherical end of the filter 12 with the holder 36 is ring-shaped and not at a single point of tangency. This produces a compression of the filter body in connection with centrifugation as opposed to expansion and thus prevents hairline cracks and mechanical failures which would occur if the contact between the outer end 14 of the filter body and the filter holder 36 were at a point.

In order to assemble the filter assembly 10 in accordance with the invention and to provide a suitably crenelated filter membrane, the filter plate 24 is laid upon the shoulder 20 in the interior of filter body 12 which in turn is supported in a filter stand 37. The latter comprises a hollow cylindrical container open at one end to receive the filter body. The filter forming ring 28 is then placed upon the filter plate 24, and a filter membrane 34 in disc form is disposed upon the filter forming ring 28. A plunger guide 38 is then placed over the inner end of filter body 12. Plunger guide 38 comprises a hollow cylindrical member having a shoulder 40 intermediately along its length. The plunger guide 38 is slid over the inner end of filter body 12 whereupon the shoulder 40 comes to rest upon the upper end of the filter stand 37, leaving a small clearance between the plunger guide and filter membrane 34.

A plunger 42 is then utilized to thrust the filter membrane 34 against the filter forming plate 28, thereby pressure-forming the filter membrane into a crenelated configuration. The plunger 42 comprises an elongate plunger handle 44 attached to a plunger head 46. Plunger head 46 has a cylindrical form with a peripheral bevel 48 at the end thereof.

To form the filter membrane, the plunger 44 is placed into the plunger guide 38 and is directed downwardly to be thrust against the filter membrane 34, thereby exerting pressure between the plunger head and the filter forming member 28. As a result, the filter membrane 34 will be pressure-formed into a crenelated cup-shaped configuration to match that of the filter forming ring 28. The plunger guide 38 is then removed by lifting it off the filter body and moving it upwardly along the direction of the handle 44 of the plunger 42. As seen in FIG. 4, in order to prevent the filter membrane from springing back to a flat or uncentered configuration or position, a filter membrane retaining member 50 is installed in place on the upper end of the filter body 12. The filter membrane retaining member 50 is generally cylindrical in configuration with a lower section having a smaller exterior radius than the upper section and defining a shoulder 54 at the junction thereof. The smaller, lower section is configured to fit into and engage the filter forming ring. In this manner, the filter membrane 34 is held tightly against the filter forming ring 28. The liquid to be filtered (not shown) is then placed in the now cup-shaped filter membrane 34. Within a short time, 20-30 seconds in some applications, a film of liquid forms between the corrugations of the filter membrane 34 and the ring 28, the film holding the membrane so that the retaining member 50 can be removed. The filter holder 36 is placed in a high-speed centrifugal rotor and is then rotated at high r.p.m. During centrifugation, the configuration of the forming ring prevents creasing of the filter membrane against the ring and prevents a tendency to slip down the ramp of the ring to form small creases at the line where the inner edge of the ring rests on the plate. Thus, the formation of unwanted pathways of the liquid around the filter membrane is inhibited.

After centrifugation, the filter membrane 34 can be readily removed by such mechanical devices as tweezers, or by simply bending the filter body 12 so that the inner assembly drops out under the force of gravity. It has been found that fluid retention on the precipitate disposed upon the filter membrane is minimized compared to existing methods, thus reducing liquid contamination and promoting and facilitating analysis of the precipitate. The liquid formerly comprising the medium of the filtrate accumulates at the bottom of the chamber 18 and may be removed by simply pouring it out of the filter body 12. The particular configuration of the filter body 12 makes cleaning of the interior an easy and quick operation. The filter assembly in accordance with the invention is particularly adapted for use in high-speed centrifuge applications. This includes the range of 5,000 through 25,000 r.p.m., though, of course, the invention may be used equally satisfactorily at any velocity below 5,000 r.p.m. as well and within a range above 25,000 r.p.m.

As depicted in FIGS. 6-9, inclusive, an alternative embodiment of the invention comprises a filter assembly 60. Filter assembly 60 includes a filter body 62 of generally cylindrical configuration and having an outer end 64 of generally hemispherical form. The filter assembly 60 is particularly adapted for use in connection with very high velocity rotation up to 50,000 r.p.m. and above. The filter body 62 is hollow and has an open inner end 63. (The terms "inner" and "outer" are used in the same manner with respect to this embodiment as in the discussion of the embodiment of FIGS. 1-5, inclusive). Filter body 62 is preferably composed of flexible material.

An insert 66 is disposed within filter body 62. Insert 66 is generally cylindrical in configuration with an outer end 68 having a hemispherical form. Insert 66 includes a shoulder 70 at its inner end which frictionally engages with the interior walls of filter body 62. Insert 66 defines a chamber 72.

A filter plate 74 rests upon shoulder 70. Filter plate 74 includes a plurality of perforations 76 for passage therethrough of liquid in connection with centrifugation of a precipitate in a liquid medium.

An anti-capillarity chamber 78, which is annular in form, lies between the lateral walls of the insert 66 and those of the filter body 62. A meniscus equalizing pore 80 is defined in one of the lateral walls of the insert 66 somewhat above the midpoint of the wall. In a particular application in which the insert 66 was approximately one-half inch in length, the equalizing pore was defined at a point 12.0 millimeters from the bottom of the insert. Other dimensions may be used in accordance with the invention for specific applications. The function of chamber 78 and equalizing pore are discussed in full detail hereinbelow.

As best seen in FIG. 9, a filter membrane 82 rests upon the top of the filter plate 74 in the assembled state of the apparatus. Filter membrane 82 is in the form of a hollow cylinder and has a plurality of crenelations in its wall 86. The filter membrane 82 may be of conventional type.

In operation, the filter assembly 60 is placed in a holder 87 in the form of a bucket (depicted in fragmentary and simplified form) attached to centrifugation equipment (not shown). Holder 87 comprises a hollow cylindrical container, with a rounded outer end, into which the filter assembly 60 is fittable. The rounded end of holder 87 has a smaller radius of curvature than that of filter insert 66. Material containing, for example, particulates in a fluid medium is placed on the filter membrane. During centrifugation, the liquid will separate from the particulate under the extremely high forces generated by rotary motion of the centrifugation equipment. The particulate will remain on the filter, and the fluid will enter the chamber 72. Due to capillary action, fluid can rise irregularly around the insert 66 and reach the filter membrane 82, thus vitiating or negating the separation sought to be accomplished between the fluid and its particulate contents. The anti-capillarity annular chamber 78 functions to prevent this. During centrifugation, fluid enters the chamber 72 and the chamber 78 and tends to fill the latter while leaving the former partially empty. The pore 80 permits the menisci in the chambers 72, 78 to attain the same level. When centrifugation ceases, however, fluid from chamber 72 would tend to flow into chamber 78 and to rise toward the membrane 82. It has been discovered, however, that when the pore is spaced substantially 12.0 millimeters from the bottom of the insert whose length is approximately one-half inch, the menisci in chambers 72, 78 remain at the same level below the pore and retain such level without further flow when centrifugation ceases. Thus, filter assemblies in accordance with the invention afford the capability of precise separation of filtrates from fluid media with relatively small contamination of the particulate matter by the fluid.

Under centrifugation, the flexible filter body 62 adapts to the centrifuge filter holder and flexes around filter insert member 66. The aforementioned relationship of the radius of curvature of the filter insert member 66 to that of the filter holder serves to prevent cracks and mechanical failures of the filter assembly in the same manner as described in connection with the embodiment depicted in FIGS. 1-5, inclusive.

To assemble the assembly 60, insert 66 is pushed into filter body 62. Filter plate 76 is then laid upon shoulder 70 of filter insert 66.

The filter body 62 is then disposed within a holder 88, and a filter membrane positioning member in the form of a collar 90 is mounted upon the filter body 62 at its open inner end 63. The membrane positioning collar 90 is disc-like in form and defines a central passage 91 with an outer portion fittable over the filter body 62; an inner portion of the passage 91 is of smaller width than the filter body 62 so that the top of the filter body 62 extends only part-way into the passage 91. The collar 90 further includes an upper peripheral flange 92. Collar 90 serves to hold the membrane 82 in position in connection with forming thereof, described below. A filter membrane 82 is then laid upon the upper surface of the collar 90, and a plunger guide member 94 is then mounted upon the collar 90. Plunger guide 94 comprises a disc defining a central cavity 96 alignable with the aperture 91 of the collar 90. Guide 94 includes a lower surface 98 and defines a shallow recess which fits around the upper flange 92 of the collar 90. A plunger 104 is then thrust through the path formed by apertures 91, 96 so as to thrust the filter membrane 82 into the filter body 62. This causes the membrane 82 to assume the desired cup-shaped, crenelated configuration. The collar 90 and the guide 94 are then moved up the plunger 104 while keeping the latter in place. The inner end of the filter body 62 is then manually manipulated with considerable pressure to flex the filter body 62 in order to set the folds in the filter membrane 82. The plunger 104, collar 90, and guide 94 are then removed. At that time, the filter assembly is fully assembled and can accept a charge of fluid.

As depicted in FIGS. 10, 11, a second alternative filter assembly in accordance with the invention includes a filter body 110 which is depicted as cylindrical in form and has an open inner end 112, a closed outer end 114, and a wall 115. Outer end 114 is rounded and has a larger diameter than that of the centrifuge holder (not shown) in which it is placed, for the purpose of minimizing stress upon the filter body 110 under the forces of the high-speed centrifugation, as described hereinabove. Filter body 110 is fabricated of the same material as is appropriate for the embodiment of FIGS. 6-10, inclusive.

In the interior of filter body 110 is defined a first peripheral shoulder 116. A second peripheral shoulder 118 is defined in the interior of filter body 110 and is spaced away from first shoulder 116 to be closer to open end 112 and further away from closed end 114 than is first shoulder 116. First shoulder 116 is of smaller diameter than second peripheral shoulder 118. A side wall 120 extends between, and connects, first shoulder 116 to second shoulder 118 and thereby forms a recess 122, and the wall 115 of filter body 110 forms in the second shoulder 118 a second recess 128. The diameter of first recess 122 is smaller than the diameter of second recess 128. In first recess 122 a filter plate member 124 is disposed. Filter plate member 124 is of the same character as that used in connection with the embodiment of FIGS. 6–10. In the second recess 128, a filter membrane 130 is placed.

Filter membrane 130 is of generally cup-shaped configuration, having a side wall 132 and a floor or bottom 134, and is of the same character as the filter membranes employed in previously discussed embodiments of the invention. Crenelations 136 are defined in wall 132 of filter membrane 130. Filter membrane 130 is disposed within second recess 128 such that its bottom 134 is disposed adjacent filter plate member 124, and its wall 132 fits into recess 128 so as to be in contact with the wall 115 of filter body 110.

Because of the difference in dimensions between the first shoulder 116 and second shoulder 118, and between the first recess 122 and the second recess, the diameter of filter membrane 130, i.e., the length of the bottom 134 of the filter membrane, is greater than the corresponding dimension of filter plate member 124. Accordingly, wall 132 of filter membrane 130 is not directly above the filter plate member 124 but is displaced laterally away from the periphery of filter plate member 124 by a distance substantially equal to one-half of the difference between the diameters of first recess 120 and second recess 128. As a consequence of this configuration of the filter membrane 130 and the filter plate member 124, upon centrifugation, the possibility that the membrane 130 may become lodged between the wall of the filter plate member 124 and side wall 120 is minimized. This is an important advantage in view of the extremely high stresses generated by ultra high-speed centrifugation.

The filter plate member 124 is dimensioned such that it is as large as possible with respect to the dimensions of recess 122 into which it is to fit, consistent with ease of removal and assembly. Inner edges 136 of inner end 112 are slightly rounded to facilitate insertion of a filter membrane and reduce the possibility of tearing the membrane during insertion.

Filter plate member 124 contains a plurality of perforations 138 for passage therethrough of filtrate material. Filter body 110 defines a filtrate cavity 140 outwardly of first shoulder 116. Filtrate cavity 140 is depicted herein to have a diameter substantially equal to that of first shoulder 120; however, this is not required under the invention, and filtrate cavity 140 may have any diameter which is appropriate for a particular application, consistent with structural integrity of first shoulder 116.

As in the embodiments described hereinabove, in operation, the filter body 110 is placed in a centrifuge holder (not shown) and is subjected to centrifugation in the range of 25,000–50,000 r.p.m.; such centrifugation causes migration of filtrate material placed initially in the cup-shaped membrane 130 into the filtrate cavity 140, thus separating fractions of the filtrate material initially placed in the membrane as desired. Of course, the efficiency of separation increases with increase of angular velocity of the centrifuge, and for this reason, filter assemblies in accordance with the invention present important advantages for a wide variety of applications.

As depicted in FIG. 12, a method for providing a filter assembly such as depicted in FIGS. 10 and 11 comprises providing a filter body 110 and placing within first recess 120 a filter plate member 124. A filter membrane 130 is then disposed within second recess 128 to fit snugly therein. The filter membrane 130 may be either preformed to fit into second recess 128 or it may simply be pressed into the filter body by a plunger 144 (shown in fragmentary view only). Plunger 144 is cylindrical and has slightly rounded edges 145 at its lower portion to coact with the rounded inner edges 132 of filter body 110. The plunger 144 may be of any desired cylindrical configuration and may, for example, include a handle such as that depicted in plunger 104 in FIG. 8, in particular applications; however, such handle is not required for effective utilization of plunger 144. In this manner, a filter assembly capable of use with extremely high-speed ultra centrifuge equipment is provided which combines the virtues of simplicity, durability, and efficiency, among others.

Though particular embodiments have been described and depicted herein, the invention is defined solely by the appended claims interpreted in light of the specification.

What is claimed is:

1. A filter assembly for use with high-speed centrifugation apparatus comprising:
   a filter body adapted to be disposed within a filter holder in a centrifugal rotor, said filter body having an outer end of generally rounded configuration, with a radius of curvature greater than that of said filter holder and defining an interior chamber;
   filter plate means disposed within said interior chamber, said filter plate means defining a plurality of fluid flow paths;
   a filter forming member disposed within said interior chamber of said filter body and adjacent said filter plate means, said filter forming member having a crenelated periphery for contact with a filter membrane, to form said membrane to a crenelated configuration.

2. The invention as set forth in claim 1 wherein said multiplicity of crenelations in said filter forming member comprises a multiplicity of spherical sections adjoining one another and intersecting at substantially straight lines and having a substantially triangular cross-section with one leg of said triangle being arcuate.

3. The invention as set forth in claim 2 wherein said spherical sections are configured such that radii of the sphere of which said spherical sections comprise a portion substantially intersect the respective vertices of said triangle formed by said arcuate section of said triangular cross-section.

4. The invention as set forth in claim 1 further including a filter membrane disposed within said interior chamber of said filter body and in contact with said filter forming member.

5. The invention as set forth in claim 4 further including a filter membrane retaining member, said filter membrane retaining member being mountable upon said filter body to contact said filter membrane to hold the latter in place in said filter membrane forming member until surface tension of the liquid to be filtered is sufficient to hold said filter membrane in place.

6. The invention as set forth in claim 5 wherein said filter membrane retaining member defines a passage for accommodating a plunger member.

7. The invention as set forth in claim 5 further including a plunger guide member, said plunger guide member being mountable upon said filter body and defining a passageway to guide passage therethrough of a plunger member.

8. The invention as set forth in claim 5 further including a plunger member configured to be movable though said passageways in said plunger guide member to apply force to said filter membrane against said filter forming member for forming said filter membrane into a desired crenelated configuration.

9. The invention as set forth in claim 1 wherein said interior chamber of said filter body includes a chamber portion for receiving fluid passing through said filter plate means upon centrifugation.

10. The invention as set forth in claim 1 further including a filter membrane, having a crenelated configuration, disposed adjacent said filter plate means.

11. A high speed filter assembly for installation in a filter holder of a high speed centrifuge comprising:
 a filter body defining a hollow interior and having an outer end fittable into said filter holder;
 a filter insert member disposed within said hollow interior of said filter body and defining an interior chamber, said filter insert member having an outer end of generally rounded configuration, said filter insert member including means for contacting the inner walls of said filter body, said filter body and said filter insert forming an anti-capillarity chamber therebetween, said filter insert defining a meniscus equalizing pore connecting said interior chamber of said filter insert member and of said anti-capillarity chamber, said meniscus equalizing pore being positioned to equalize the level of fluid between said interior chamber of said filter insert member and said anti-capillarity chamber; and
 filter plate means disposed in contact with said filter insert member and defining a plurality of perforations for passage therethrough of fluid.

12. The invention as set forth in claim 11 further including a filter membrane in contact with said filter plate member.

13. The invention as set forth in claim 12 wherein said filter membrane is configured to have a substantially flat, closed outer end and an open inner end and includes a peripheral wall in contact with the wall of said filter body.

14. The invention as set forth in claim 13 wherein said peripheral wall of said filter membrane is crenelated.

15. The invention as set forth in claim 12 wherein said anti-capillarity chamber is annular in form.

16. The invention as set forth in claim 15 further including a filter membrane positioning member mountable upon said filter body to hold said filter membrane in a selected position and further including a plunger guide member mountable upon said filter membrane retaining member and defining a passage therethrough for a plunger member, for guiding said plunger member.

17. The invention as set forth in claim 16 further including a plunger member movable though said passages in said filter membrane positioning member and said plunger guide member to thrust said filter membrane, when disposed upon said filter membrane positioning member, into said filter body, thereby forming said filter membrane into a desired crenelated configuration.

18. The invention as set forth in claim 11 wherein the filter body is composed of flexible material.

19. The invention as set forth in claim 11 wherein said filter holder of said centrifuge has a radius of curvature and wherein said filter insert member has a larger radius of curvature than said filter holder.

20. A method for providing a filter assembly for use in high-speed centrifugation wherein said filter assembly is placed within a filter holder rotatable at high rotational velocities comprising the steps of:
 (a) providing a filter body having a hollow interior and fittable into said filter holder;
 (b) positioning a filter insert member within said filter body to form a fluid retaining cavity and a meniscus equalizing pore connected thereto;
 (c) disposing a filter plate member in contact with said filter insert member;
 (d) disposing a filter membrane upon the open end of said filter body; and
 (e) forcibly thrusting said filter membrane into said filter body against said filter plate member, whereby said filter membrane assumes a folded form whereby it has crenelated sides and a substantially flat bottom in contact with said filter plate member and said crenelated sides are in contact with the wall of the filter body.

21. The method as set forth in claim 20 wherein said filter body is of flexible material and further including the step of flexing the filter body portion in which the said formed membrane is disposed to set the folds in the membrane member.

22. The method as set forth in claim 20 wherein said thrusting of said membrane into said filter body and against said filter plate member is accomplished by use of a plunger member, said plunger member being thrust into said open end of said filter body to press said filter membrane member thereinto.

23. A filter assembly for high-speed centrifugation comprising:
 a filter body having a peripheral wall, an outer end of generally hemispherical configuration, and an open inner end, said hemispherical outer end having a radius larger than that of a filter holder into which said filter body is placed for centrifugation, said filter body having a generally hollow interior and including a first interior shoulder extending from the wall of said filter body and including a second interior shoulder extending from the wall of said filter body and spaced from said first interior shoulder, the latter being closer to said hemispherical outer end of said filter body than the former, said filter body further including an interior side wall disposed between said first shoulder and said second shoulder to form a first recess, said second shoulder and the wall of said filter body forming a second recess, the diameter of said first shoulder being smaller than the diameter of said second shoulder, and the diameter of said first recess being smaller than the diameter of said second recess.

24. The invention as set forth in claim 23 further including a filter plate member disposed within said first recess, said filter plate member defining a plurality of perforations for passage therethrough of filtrate material and being supported by said first shoulder.

25. The invention as set forth in claim 24 further including a filter member disposed within said second recess, said filter member having a generally cup-shaped configuration and including a floor and a side wall, said filter member being in contact with said second shoulder and above said filter plate member, the side wall of said filter member being in contact with the wall of said filter body, the floor of said filter member having a diameter greater than that of said filter plate member.

26. The invention as set forth in claim 25 wherein the side wall of said filter member is laterally displaced from the periphery of the filter plate member.

27. The invention as set forth in claim 26 wherein said filter body defines a filtrate cavity outwardly of said first shoulder for reception therein of filtrate material passed thereinto through said perforations of said filter plate member from a liquid medium contained in said filter member, upon centrifugation.

28. The invention as set forth in claim 25 wherein the side wall of said filter member is crenelated.

* * * * *